United States Patent [19]
Argent et al.

[11] Patent Number: 5,151,918
[45] Date of Patent: Sep. 29, 1992

[54] ELECTRODE BLOCKS AND BLOCK ASSEMBLIES

[76] Inventors: Ronald D. Argent, 9319 Chase Pl., Allison Park, Pa. 15101; Richard A. Ruthers, 4308 Lynnbrook Dr., Louisville, Ky. 40220; Roy A. Webber, 72 S. Florida St., Buckhannon, W. Va. 26201

[21] Appl. No.: 574,332

[22] Filed: Aug. 28, 1990

[51] Int. Cl.$^5$ .............................................. C03B 5/02
[52] U.S. Cl. ........................................ 373/27; 373/36; 373/30
[58] Field of Search ................. 373/27, 36, 37, 38, 373/52, 94, 72, 74, 108, 155, 162, 164, 137, 30, 71, 95, 166; 65/374.13; 501/103, 105, 132

[56] References Cited

U.S. PATENT DOCUMENTS

| | | | |
|---|---|---|---|
| 3,576,385 | 4/1971 | Robinson | 376/36 |
| 3,634,588 | 1/1972 | Steitz et al. | 373/37 |
| 3,773,531 | 11/1973 | Manigault | 106/57 |
| 4,119,472 | 10/1978 | Brashear, Jr. et al. | |
| 4,374,897 | 2/1983 | Yamaguchi | 428/446 |
| 4,566,108 | 1/1986 | Bühler | 373/108 |
| 4,647,547 | 3/1987 | Singh et al. | 501/103 |

Primary Examiner—Bruce A. Reynolds
Assistant Examiner—Michael D. Switzer
Attorney, Agent, or Firm—Panitch, Schwarze, Jacobs & Nadel

[57] ABSTRACT

Electrode blocks and multiple-piece assemblies are provided for electric, glass-melting furnaces to reduce the occurrence and extent of cracking which occurs in monolithic electrode blocks from thermal stresses induced by a high temperature gradient between such blocks or the block assembly and a fluid-cooled electrode and from thermal shock encountered in repositioning the electrode. An insert block of a high thermal stress and glass corrosion/erosion resistant refractory material is configured to receive an electrode assembly. A holder block, which may be of the same material or another material, including a material having less thermal stress strength or less glass corrosion/erosion resistance than the insert block material, has a passageway therethrough to receive at least part of the insert block with electrode assembly therethrough. Densified chromic oxide with zirconia is presently preferred as the insert block composition while fusion cast AZS is presently preferred for the holder block receiving the insert block.

19 Claims, 3 Drawing Sheets

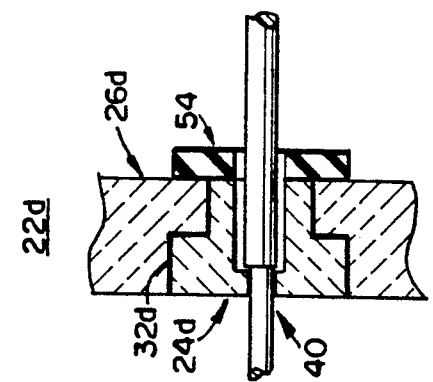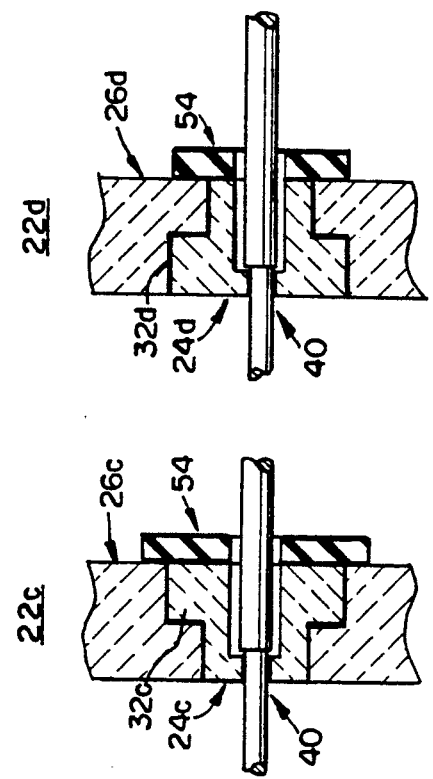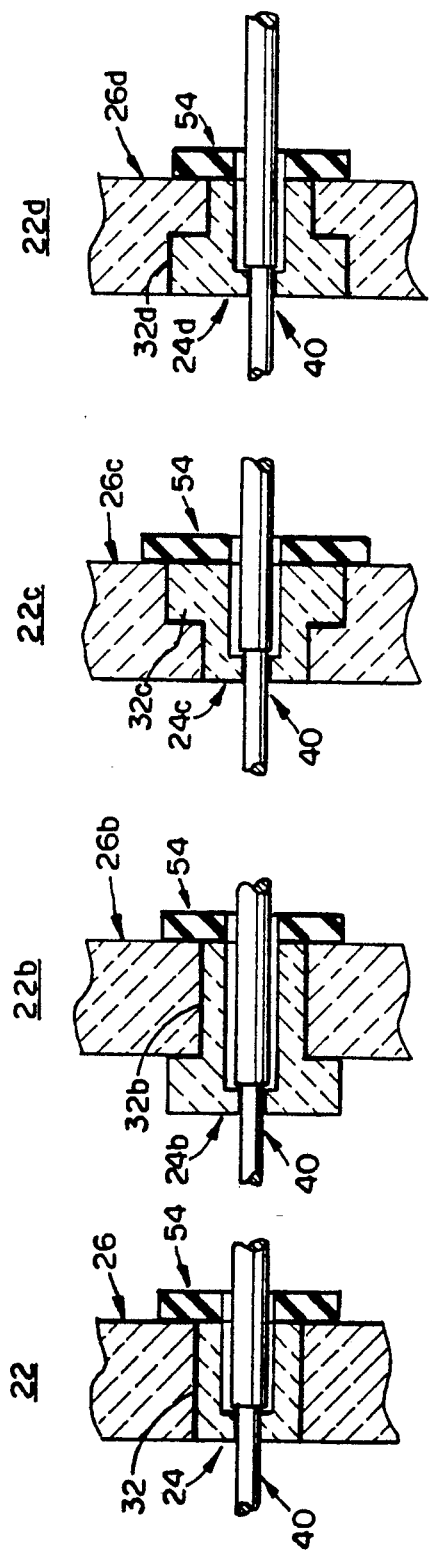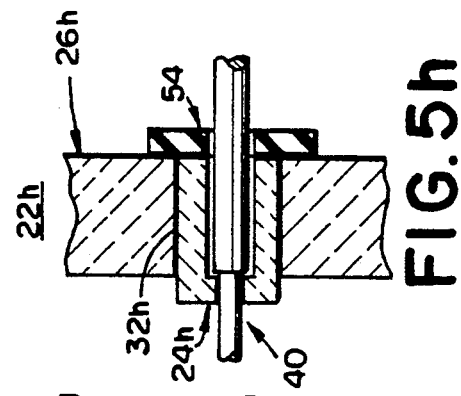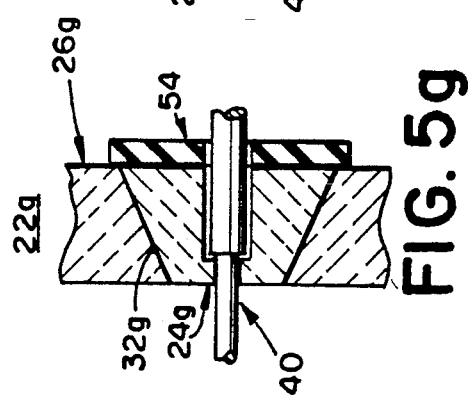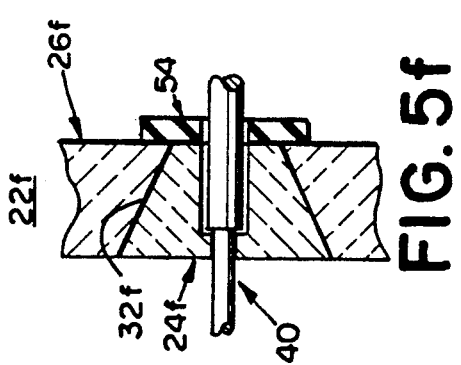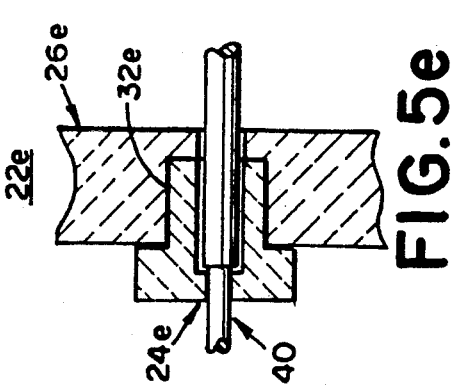

ELECTRODE BLOCKS AND BLOCK ASSEMBLIES

FIELD OF THE INVENTION

This invention relates to electrically heated glass-melting furnaces and, in particular, to refractory blocks receiving electrodes used in such furnaces.

BACKGROUND OF THE INVENTION

Electrodes are sometimes used as the sole or auxiliary heating sources in glass-melting furnaces. The electrodes are typically positioned in the glass-melting furnaces by being extended through the walls of such furnaces. Typically, an "electrode block" of uniform composition is provided forming a portion of the wall and having a closed perimeter interior opening or passageway through which the electrode is extended into the furnace.

For many reasons, molybdenum is a generally accepted electrode material for use in glass-melting furnaces. One problem molybdenum experiences is that it oxidizes when heated above 500° C. To overcome this problem, a common approach has been to provide the electrode in an assembly including a holder which supports the electrode and which circulates a cooling fluid such as water, inert gas or both about a portion of the electrode which is not covered by glass and therefore subject to oxidation.

Fluid cooling creates a wide thermal gradient between the surface of the fluid-cooled electrode assembly and the surrounding refractory electrode block, particularly at the innermost surface of the block forming the exposed inner surface or "hot face" of the furnace where the glass is melted and temperatures are greatest. The wide thermal gradient can cause cracking of the electrode block. The cracking involved is commonly referred to as "star cracking" an spreads radially outwardly from the electrode opening or passageway through the block. A crack on the hot face of the block encourages glass penetration which can lead to increased erosion/corrosion of the block.

In some instances, the consumption of electrode material is compensated for by inserting additional electrode material into the furnace. To do this with a conventional fluid-cooled electrode assembly, it has been necessary to stop the flow of cooling fluid. After insertion of the electrode material, cooling fluid is once again circulated through the assembly. This operation induces thermal shock stress in the electrode block surrounding the electrode assembly. Again, both type of thermal stresses (gradient induced and shock induced) tend to be relieved by cracking of the electrode block. There is always a concern with glass melting furnaces, which may be run continuously for months and even years, that increased erosion/corrosion due to cracking can necessitate the premature shutdown of the furnace and possible economic losses accompanying such shutdown.

SUMMARY OF THE INVENTION

The invention is directed to the solution of the problem of thermal cracking induced in conventional electrode blocks of electrically heated glass-melting furnaces and, correspondingly, to solving the problem of premature erosion/corrosion of such blocks due to thermal stress cracking.

In one aspect, the invention is an electrode block assembly for use with electrode means melting glass in a glass-melting furnace receiving the block assembly. The block assembly comprises a first block of a first refractory composition and a second block of a second refractory composition. The first block has a passageway therethrough configured to receive at least part of an electrode means extended entirely through the first block. The second block has a passageway therethrough configured to receive at least part of the first block and an electrode means extended entirely through the first block passage.

In another aspect, the invention is a first refractory block including a passageway therethrough configured to receive at least part of a glass-melting electrode assembly extended entirely through the first block to permit the first block to be installed with the electrode assembly as at least part of a wall of an electrically heated glass-melting furnace, the first refractory block being formed of a first substantially uniform refractory composition consisting essentially of by weight about 80 to 97% $Cr_2O_3$, about 1 to 8% $TiO_2$, and about 2 to 12% $ZrO_2$, at least a portion of the zirconia being unstabilized.

BRIEF DESCRIPTION OF THE DRAWINGS

The foregoing summary and the following detailed description of embodiments of the invention will be better understood when read in conjunction with the appended drawings. For the purpose of illustrating the invention, there is shown in the drawings various embodiments including embodiments presently preferred. It should be understood, however, that the invention is not limited to the precise arrangements and instrumentalities shown. In the drawings:

FIG. 5a is a simplified diagrammatic cross-elevation view of the electrode block assembly of FIGS. 1-4a; and FIGS. 5b through 5h are diagrammatic cross-elevations of alternate electrode block assemblies of the present invention.

DETAILED DESCRIPTION OF EMBODIMENTS

Figure 1:
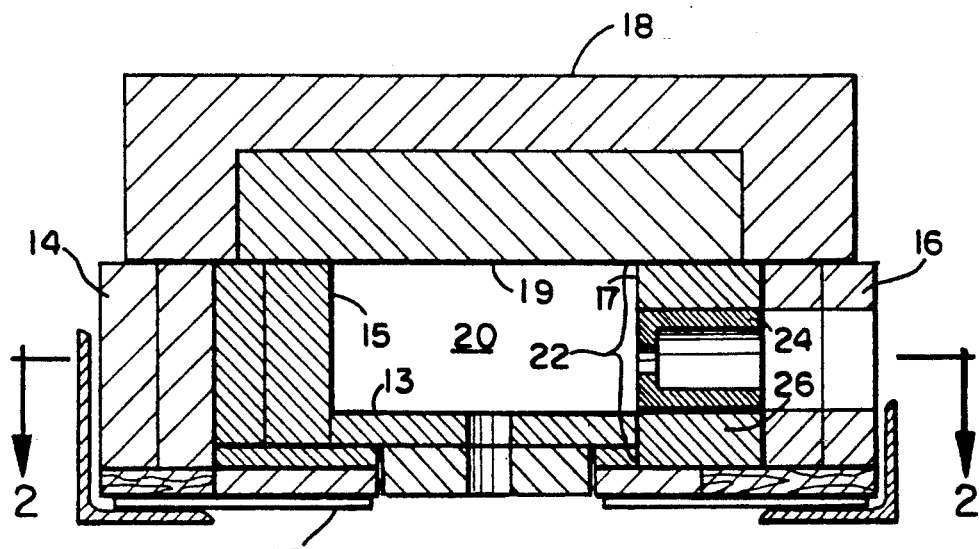
FIG. 1 is a diagrammatic cross elevation of a portion of a conventional, electric glass-melting furnace taken along the lines 1—1 of FIG. 2.

Referring to the drawings, like reference numerals identify like elements throughout.

Figure 2:
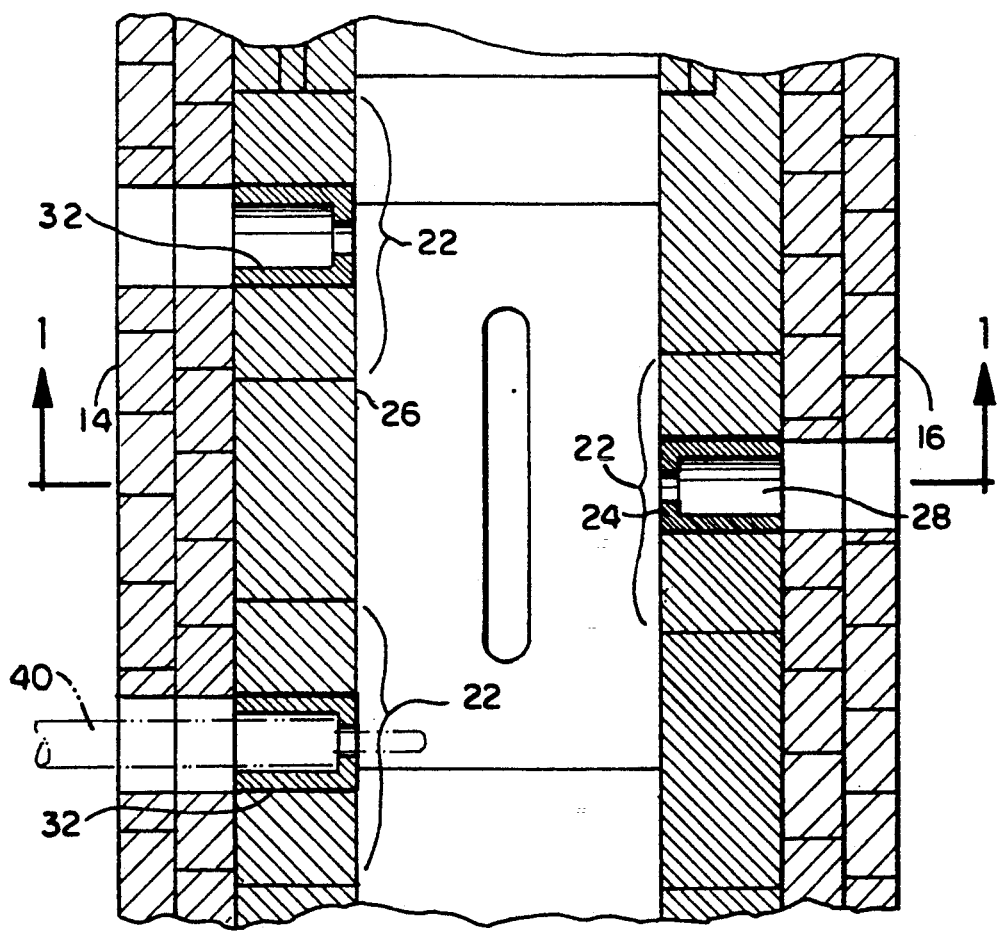
FIG. 2 is a diagrammatic cross plan view of the furnace portion of FIG. 1 along the lines 2—2.

FIGS. 1 and 2 depict diagrammatically in different cross-sectional views, the construction of a forward or delivery section of a conventional, electric, textile fiber glass-melting furnace, indicated generally at 10. The furnace 10 would include an upstream portion, electrically heated in the same manner, in which raw materials would be initially melted. In such a furnace 10, electricity is the sole source of heating. In addition to all-electric furnaces, some glass-melting furnaces use electricity for auxiliary heating at certain locations in combination with another heat source, such as flamed natural gas, to heat the interior of the furnace.

Referring first to FIG. 1, the furnace 10 is typically constructed by layering various refractory blocks to form a base, indicated generally at 12, side walls, indicated generally at 14 and 16, and a roof, indicated generally at 18. Inner surfaces of the base 12, side walls 14 and 16 and roof 18 facing and defining the boundaries of an interior open area within the furnace, indicated generally at 20, within which the glass is melted. Blocks of differing refractory compositions are typically used in constructing such furnaces 10. The composition of the blocks forming the inner exposed surface 13 of the base 12 and inner exposed surfaces 15 and 17 of side walls 14 and 16, respectively, which are in direct glass/slag contact, may be fused cast AZS of densified zircon, for example, for thermal shock and glass-corrosion resistance. The block(s) providing the inner surface 19 of the roof also may be the same material as surfaces 13, 15 and 17, or a less expensive, less glass-corrosion resistant composition if not in continuous or regular glass/slag contact. For example, materials such as densified zircon can be used as the roof material with AZS inner walls or a lesser grade of zircon can be used with densified zircon inner walls. The outer, surrounding blocks may be of an even less expensive and less glass-corrosion resistant composition, such as pressed fire brick. Construction of the internal open melt area in other portions of the furnace would generally be the same. Other combinations of refractory materials, brick arrangements and furnace layouts and designs have been used and are known to those of ordinary skill in this art and no attempt will be made to enumerate all of the possible combinations or variations which have been or which may be used in glass furnace construction.

There is provided in the side wall 16 in FIG. 1 an electrode block assembly, indicated collectively at 22, comprising a first refractory block, sometimes hereinafter also referred to as the insert block, and a second refractory block 26, sometimes hereinafter also referred to as the holder or receiver block. As is best seen in FIG. 2, a plurality of the electrode block assemblies 22 are provided along an indicated length of the furnace in both of the sidewalls 14 and 16. Each first or insert block 24 includes a preferably centrally located passageway or opening therethrough, indicated generally at 28, which is configured, by sizing and shaping, to receive at least part of an electrode means, indicated in phantom at 40 in FIG. 2. At least part of the electrode means 40 extends entirely through the passageway 28 of the first block 24. Each second block 26 of each electrode block assembly 22 also includes a passageway therethrough and indicated generally at 32, configured to receive at least part of the first block 24. In the embodiment depicted in FIGS. 1 and 2, the passageway 32 through the second block 26 is cylindrical and centrally located and receives the entirety of the first block 24. The first block 24 may simply be fitted into the passageway 32 of second block 26 or the two blocks may be bonded together using conventional ceramic bonding compositions suitable for use with the materials selected for the blocks 24 and 26. Except for the provision of the electrode block assemblies 22 of the present invention, the construction of the furnace 10 is otherwise conventional.

Figure 3:
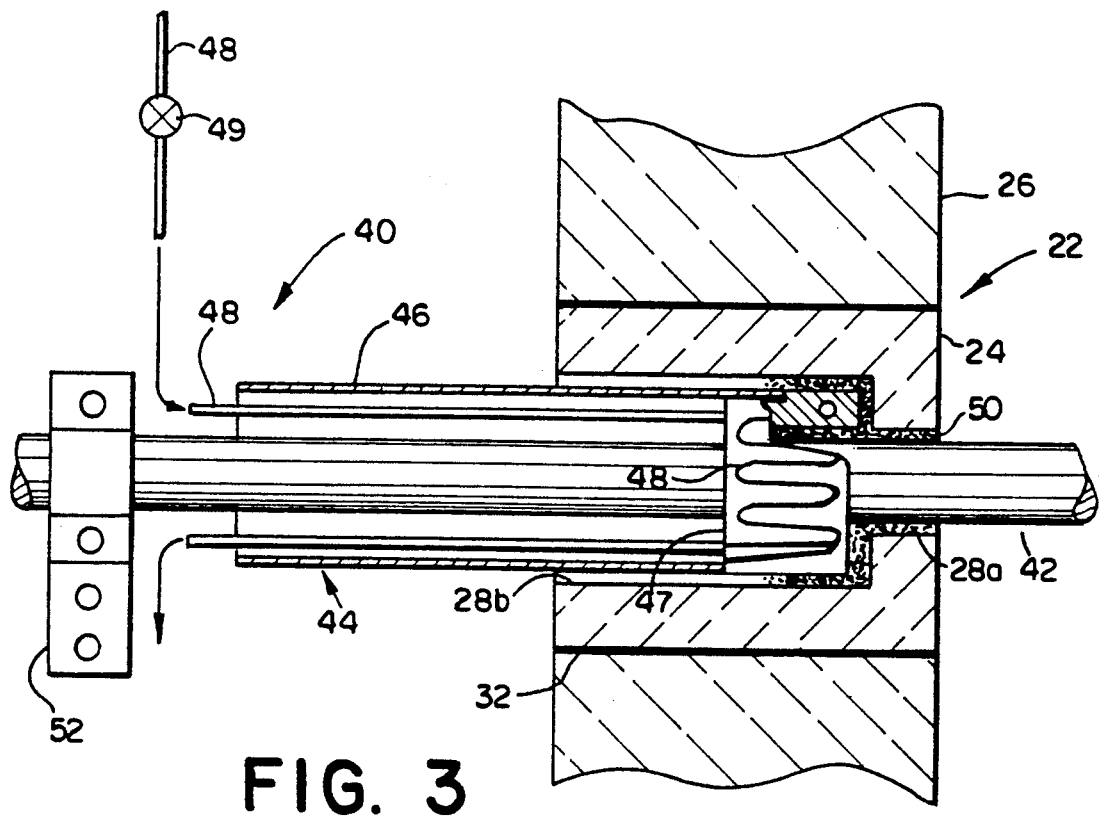
FIG. 3 is a diagrammatic partially broken away view of a conventional electrode assembly installed in an electrode block assembly of the furnace of FIGS. 1 and 2.

FIG. 3 depicts one of a variety of known molybdenum electrode assemblies, indicated diagrammatically at 40, mounted in the electrode block assembly 22. The electrode assembly 40 includes an electrode in the form of a molybdenum conductor or rod 42 centrally positioned in a holder, indicated generally at 44, surrounding conductor 42. The conductor 42 passes electric current therethrough for melting glass within the furnace. Holder 44 in the depicted embodiment includes a generally cylindrical housing 46 mounting a generally annular nose cone 47 at an end of the housing 46 closest to the interior 20 of the furnace 10. Piping 48 is provided extending into the housing 46, meandering through the nose cone 47 and extending out of the housing 46 again to permit water or other cooling fluid to be circulated into the housing 46 and through the nose cone 47 to cool the molybdenum electrode 42.

The first block passageway 28 consists of a first portion 28a extending from the exposed inner surface 17 of the interior furnace wall 16 of a diameter slightly larger than the diameter of conductor 42. A second portion 28b of the passageway 28, contiguous with the first portion 28a, is of a larger diameter for receiving the holder assembly 44 including the nose cone 47 end of the housing 46. The passageway 28 through the insert block 26 is preferably closely configured in size and shape to the electrode assembly so that only very small gaps exists between the conductor 42 and the housing 46 and the walls of the passageway 28 into which molten glass from the interior of the furnace 10 is permitted to penetrate. Preferably, the gaps are at least about one millimeter in width to permit glass penetration. Larger gaps may be necessary or desirable to permit greater glass penetration. Preferably too, the glass seal is permitted to extend into an annular space provided between the conductor 42 and the nose cone 47 within the housing 46 to permit molten glass to be pulled within the holder 44 to eliminate any air pockets which might cause problems in the heat-transition zone. The cooling fluid, which is circulated through the piping 48 by suitable means such as a pressurized source or pump, indicated diagrammatically at 49, cools not only the molybdenum conductor 42 but also the molten glass entering these narrow areas so as to form a glass seal indicated generally at 50 between the electrode assembly 40 and the passageway 28 through the insert 24 and between the nose cone 47 and the conductor 42. An electrical connection to the conductor 42 is indicated generally at 52. In addition, it is also possible to position a thermocouple or other temperature-sensing means (not depicted) within the assembly 44 to monitor the temperature of the conductor 42 where the electrode is likely to be exposed closest to the glass seal 50.

The electrode assembly 40 depicted is merely exemplary. Other types of electrode assemblies of molybdenum and other materials are known or are being considered for use and would be suitable in connection with the present invention. These include other designs in which water or other liquid is simply sprayed into the interior of a housing and allowed to drain off from the housing, in which an inert gas is sealed within the housing and around the conductor and in which fluid is circulated directly through the electrode, dispensing with the need for a separate housing-type holder.

It is also possible to feed the conductor 42 of the depicted electrode assembly 40 further into the interior open area 20 housing the melted glass. This is done by stopping the flow of fluid to the piping 48 and permitting the conductor 42 to heat up in the area of the glass seal 50 until the glass seal 50 is softened sufficiently to permit the conductor 42 to be pushed through the seal 50 and further into the furnace 10. The end of the conductor 42 exposed outside the furnace can be suitable configured for example by the provision of a threaded bore, so as to receive a comparably sized and threaded male member at the end of a second molybdenum rod. In this way, a virtually endless length of molybdenum conductor can be fed into the furnace 10.

Figure 4A:
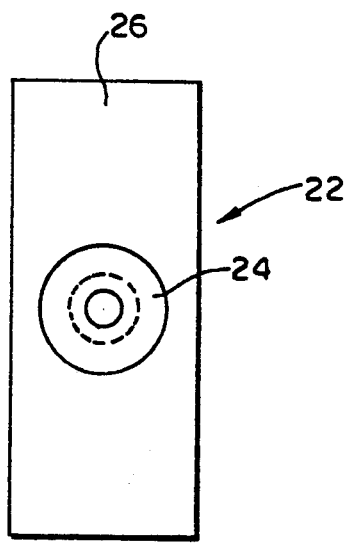
FIG. 4a is a diagrammatic representation of the electrode block assembly of FIGS. 1-3 at the inner surface of the wall facing and defining the interior glass-melt area of the furnace of FIGS. 1 and 2.
Figure 4B:
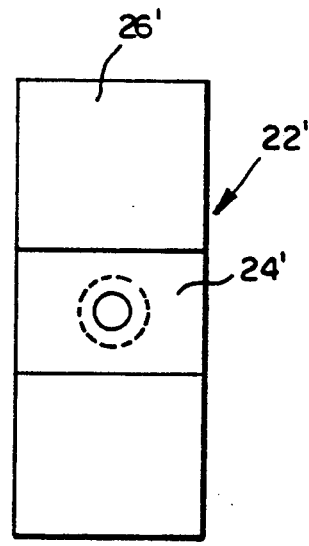
FIG. 4b is a diagrammatic elevation view of an alternate configuration of the electrode block assembly on the inner wall surface of the furnace.

FIG. 4a depicts a front elevation view of the electrode block assembly 22 of FIGS. 1 through 3 as it would be seen on the inner surface 17 of the wall 16 of the furnace 10 in which the first block 24 and at least an upper portion and side portions (hidden in FIGS. 1 and 3) of the second block 26 are exposed, forming apart of the inner surface 17 of that wall 16. FIG. 4b depicts one possible alternate configuration of the outer surface of an electrode block assembly 22′ forming part of the exposed inner surface 17 (and/or 15) of the furnace wall 16 (and/or 14).

Embodiment 22 of the electrode block assembly depicted in FIGS. 1 through 4a is depicted again in FIG. 5a and includes a generally cylindrical first block or insert 24 received in a central cylindrical passageway 32 of a generally rectangular second block 26. FIGS. 5b through 5h depict seven other possible alternative electrode block assembly configurations, indicated generally at 22b-22h, including seven alternative configurations to the shape of first block or insert 24b-24h and of the corresponding shape of the passageway 32b-32h through a second block 26b-26h. If desired, a conventional, electrical insulator 54 can be provided around the electrode assembly 40 where the electrical connection 52 is exposed.

Since at least the initial envisioned use of the electrode block assemblies of the present invention is to receive fluid-cooled electrode assemblies, an important consideration is the ability of the composition of the insert or first block (hereinafter sometimes also referred to as the "first composition") to resist glass corrosion-/erosion and to sustain thermal stress both from a wide thermal gradient between the insert and the cooled electrode assembly and from thermal shock encountered when feeding more of the conductor into the furnace during operation. It is presently envisioned and preferred to use a densified chromic oxide composition for the first or insert block which receives the electrode assembly. The envisioned chromic oxide composition believed to be most suited for this use consists essentially of, by oxide analysis, up to about ninety-seven percent by weight chromic oxide, up to about eight percent by weight titania and up to about twelve percent by weight zirconia, at least a portion of the zirconia preferably all of the zirconia being unstabilized. It is presently preferred that at least about two percent by weight of the zirconia is unstabilized to provide adequate thermal shock damage resistance. Up to about four percent by weight of other oxides and metals, which are inseparably present in the raw materials combined to form the refractory may remain in the refractory as well. Chromic oxide compositions within this range are disclosed and discussed in detail in pending application Ser. No. 358,776 entitled "CHROMIC OXIDE REFRACTORIES WITH IMPROVED THERMAL SHOCK RESISTANCE", filed May 26, 1989 and incorporated by reference herein in its entirety. Two specific chromic oxide compositions are presently preferred. The first combines about seventy-nine percent by weight chrome sesquioxide ($Cr_2O_3$) particles with about four percent by weight titania particles and about three percent by weight unstabilized zirconia particles together with about fourteen percent by weight of particles of a densified chromic oxide grog plus any desired processing aids such as plasticizers and/or binders. The grog may be formed by sintering about ninety-six percent by weight chrome sesquioxide with four percent by weight titania. The grog refractories may be new pieces fired specifically for this use or used glass furnace brick of this composition, cleaned and crushed for this purpose. Also, firing rejects and eventually recycled bricks of the preferred composition or similar compositions with zirconia also could be used as sources of all or some of the grog. The second presently preferred composition combines particles in a ratio of about forty-two percent by weight chrome sesquioxide, 1.75% by weight titania, three percent by weight unstabilized zirconia with the balance to one-hundred percent by weight supplied by the densified chromic oxide grog referred to above. The chrome sesquioxide and titania are preferably pigment grade. The zirconia is preferably a high purity, fine monoclinic zirconia having a median diameter of about 1.5 microns and a cumulative mass of about thirty-five percent by weight less than one micron in diameter as referred to in the above-referenced application. The particle size distribution of the grog is preferably the fifty percent −325 Mesh distribution also disclosed in the above-referenced paten application.

The chromic oxide compositions described in the above-referenced patent application, particularly the preferred compositions, show markedly superior ability to sustain thermal stress induced both by temperature gradients and by thermal shock in comparison to prior known densified chromic oxide compositions lacking the zirconia addition. These thermal stress resistance chromic oxide compositions further maintain high corrosion/erosion resistance comparable to the original densified chromic oxide compositions lacking the zirconia addition.

Although the exposure of chrome on the hot face is a concern in certain types of glass furnaces, due to possible coloration of the glass, the present invention offers an improvement over prior monolithic electrode block designs in that only the insert need be made of chromic oxide. Furthermore, a configuration of that insert can be selected which minimizes the chromic oxide actually exposed at the hot face, to minimize the chrome/glass contact area.

It is currently envisioned to use fusion-cast, void free AZS as the preferred refractory material for the second or insert-receiving block 24 of the assembly. Such compositions are described, for example, in U.S. Pat. No. 4,119,472 entitled "FREEBONDED FUSION-CAST AZS REFRACTORY GRAIN", incorporated by reference in its entirety herein. The compositions which are currently believed to be preferred are compositions identified as AZS-1 and -2 in that patent or very comparable compositions. The preferred compositions are used in their original fusion cast form and are not rebonded as is further disclosed in that patent.

Other possible compositions which are candidates for use as either or both of the insert and receiver blocks 24 and 26 are densified zircon, with or without zirconia added for enhanced thermal shock resistance. Contemplated compositions are disclosed generally in U.S. Pat.

application Ser. No. 404,819 entitled "ZIRCON REFRACTORIES WITH IMPROVED THERMAL SHOCK RESISTANCE", filed Sep. 8, 1989, which is incorporated by reference herein in its entirety. The zircon compositions with added, unstabilized zirconia are particularly preferred as the compositions of the insert or first block of the assemblies of the present invention due to the enhanced thermal shock damage resistance capability of that material over previous densified zircon compositions lacking the zirconia additive.

The preferred specifications for the molybdenum electrode are 99.95% minimum purity, about 1.25 to 2 inches in diameter, 10.2 gm/cc minimum density, 50-150 micron grain diameter homogeneous throughout the rod and free from surface cracks. In some instances, electrode rod diameters may range as high as six inches.

In most instances, type 302 stainless steel is suitable for construction of the holder assembly 44. However, type 310 stainless steel, which has a higher heat resistance, may be preferred for special applications.

It is the expectation that the electrode block assemblies of the present invention will reduce if not eliminate the star cracking problem encountered by previous monolithic electrode blocks, or, at the very least, contain the cracking to the insert block 24. The present invention further has the potential to reduce corrosion/erosion around the electrode by permitting the use of a material with a greater erosion/corrosion resistance as the insert material. However, there is no requirement that the insert block 22 be of a different chemical composition than the holder block 24 or other blocks of the furnace. Indeed, as was mentioned above, it may be found in some application that the primary benefit of the present invention is to limit any cracking which occurs to the insert. Also, many of the proposed configurations of the electrode block assemblies of the present invention, if suitably installed on a side wall of a furnace, may permit removal and replacement of an insert without total furnace shutdown.

While thermal shock resistant chromic oxide and AZS compositions referred to above are the presently preferred compositions for the insert and holder blocks, respectively, of the assemblies of the present invention, other refractory materials which would be suitable for use in one or both types of blocks include, but are not limited to zircon, alumina, tin oxide and zirconia and combinations thereof preferably with appropriate densifying agents.

Although the insert and holder blocks which have been discussed thus far each includes a passageway in the form of a generally centrally located, radially symmetric opening extending through each block, it is further possible that either or both of the insert and holder blocks may be provided by two or more individual refractory elements in which the passageway for receiving the electrode means or the insert block, respectively, is formed by a suitably shaped outer surface of each individual block. For example, an insert block may be provided by two semiannular refractory members each having a pair of opposing semicylindrical surfaces adapted to receive and fit over approximately one-half of an electrode assembly and within a cylindrical passageway 32 through a receiver block 26. Similarly, two or more separate refractory elements may be suitably configured to each receive part of an insert block between them.

While preferred and other embodiments have been described and modifications thereto suggested, one of ordinary skill will appreciate that other modifications may be made without departing from the broad inventive concepts thereof. It should be understood, therefore, that the invention is not limited to the particular embodiments disclosed but is intended to cover any modifications which are within the scope and spirit of the invention, as defined by the appended claims.

We claim:

1. An electrode block assembly for use with electrode means melting glass in a glass melting furnace receiving the block assembly, the block assembly comprising:
   a first block of a first refractory composition, the first block having a passageway therethrough configured to receive at least part of an electrode means extended entirely through the first block; and
   a second block of a second refractory composition, the second block having a passageway therethrough configured to receive at least part of the first block and an electrode means extended entirely through the first block.

2. The electrode block assembly of claim 1 wherein the thermal shock damage resistance of the first refractory composition is greater than the thermal shock damage resistance of the second refractory composition.

3. The electrode block assembly of claim 1 wherein the first refractory composition is selected from the group consisting essentially of zircon, tin oxide, chromic oxide, zirconia, titania and combinations thereof, at least a portion of the zirconia being unstabilized.

4. The electrode block assembly of claim 3 wherein the first refractory composition consists essentially of, by weight about 80 to 97% $Cr_2O_3$ and about 2 to 12% $ZrO_2$, about 1 to 8% $TiO_2$, at least a portion of the $ZrO_2$ being unstabilized.

5. The electrode block assembly of claim 3 wherein the second refractory composition is selected from the group consisting essentially of tin oxide, chromic oxide, alumina, zirconia, titania, zircon, AZS and combinations thereof.

6. The electrode block assembly of claim 1 in combination with electrode means adapted for melting glass within a furnace, the passageway of the first block being sized and shaped to permit at least part of the electrode means to be extended entirely through the first block along the first block passageway, the electrode means including conductor means for passing electric current therethrough and fluid means for cooling at least part of the conductor means along the first block passageway, the first block passageway further permitting at least an end of the conductor means to be fed therethrough into a glass melting furnace receiving the combination.

7. The combination of claim 6 in further combination with the glass melting furnace, the electrode block assembly forming part of an inner surface of a wall of the furnace defining an interior open glass-melting area of the furnace, at least part of the electrode means passing entirely through the passageway of the first block into the interior open area of the furnace.

8. The combination of claim 7 wherein the second block is formed of a second, substantially uniform refractory composition having a thermal shock damage resistance less than the thermal shock damage resistance of the first refractory composition.

9. The combination of claim 7 wherein the second block is formed of a second, substantially uniform refractory composition having a glass corrosion resistance less than a glass corrosion resistance of the first refractory composition.

10. The electrode of claim 1 wherein the block assembly second refractory composition is the same uniform refractory composition as the first refractory composition.

11. The electrode block assembly of claim 10 in combination with the electrode means, the electrode means being sized and shaped whereby at least part of the electrode means can be extended entirely through the first block along the first block passageway, the electrode means including conductor means for passing electric current therethrough and fluid means for cooling at least part of the conductor means along the first block passageway, the first block passageway further permitting at least an end of the conductor means to be fed therethrough into a glass melting furnace receiving the combination.

12. The combination of claim 11 in further combination with the glass melting furnace, the first refractory block forming part of an inner surface of a wall of the furnace defining an interior open glass-melting area of the furnace, at least the conductor means passing through the passageway of the first block into the interior open area of the furnace.

13. The electrode block assembly of claim 1 wherein the passageway of the second block has a closed perimeter surrounding the received portion of the first block.

14. The electrode block assembly of claim 1 wherein the passageway of the first block is empty before receiving the electrode means.

15. The combination of claim 14 wherein the passageway of the second block has an integral perimeter entirely surrounding the received portion of the first block.

16. The combination of claim 12 wherein the passageway of the second block has an integral perimeter entirely surrounding the received portion of the first block, the second refractory block also forming part of the inner surface of the wall of the furnace defining the interior open glass-melting area.

17. The electrode block assembly of claim 1 wherein the first block has 6 an integral outer perimeter entirely surrounding the passageway therethrough and wherein the passageway of the second block has an integral perimeter surrounding at least about one half of the outer perimeter of the first block.

18. The combination of claim 14 wherein the first block has an integral outer perimeter entirely surrounding the passageway therethrough and wherein the passageway of the second block has an integral perimeter surrounding at least about one half of the outer perimeter of the first block.

19. The combination of claim 12 wherein the first block has an integral outer perimeter entirely surrounding the passageway therethrough and wherein the passageway of the second block has an integral perimeter surrounding at least about one half of the outer perimeter of the first block, the second refractory block also forming part of the inner surface of the wall of the furnace defining the interior open glass-melting area.

* * * * *